(12) United States Patent
Majewicz

(10) Patent No.: US 8,554,005 B1
(45) Date of Patent: Oct. 8, 2013

(54) DIGITAL IMAGE ENHANCEMENT METHOD AND SYSTEM THAT EMBOLDEN OR THIN IMAGE FEATURES

(75) Inventor: Peter Majewicz, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1112 days.

(21) Appl. No.: 12/417,615

(22) Filed: Apr. 2, 2009

(51) Int. Cl.
*G06K 9/40* (2006.01)

(52) U.S. Cl.
USPC .......... 382/266; 382/199; 382/205; 382/275; 382/173; 382/254; 382/104; 382/166; 382/261; 358/296

(58) Field of Classification Search
CPC ...................... G06T 5/001; G06T 2207/20192; G06T 2207/20012; H04N 1/58; H04N 1/4092; H04N 1/409
USPC ......... 382/266, 199, 205, 275, 173, 254, 104, 382/166, 261; 358/296
See application file for complete search history.

(56) References Cited

U.S. PATENT DOCUMENTS

| | | | |
|---|---|---|---|
| 4,668,995 A | 5/1987 | Chen et al. | |
| 5,029,108 A | 7/1991 | Lung | |
| 5,450,531 A | 9/1995 | Ng et al. | |
| 6,430,321 B1* | 8/2002 | Choo | 382/299 |
| 6,665,448 B1 | 12/2003 | Maurer | |
| 6,941,014 B2* | 9/2005 | Lin et al. | 382/176 |
| 7,151,858 B2* | 12/2006 | Kyong | 382/266 |
| 7,151,863 B1* | 12/2006 | Bradley et al. | 382/299 |
| 7,411,699 B2 | 8/2008 | Lee | |
| 8,225,074 B2* | 7/2012 | Chakradhar et al. | 712/17 |
| 2003/0048461 A1 | 3/2003 | Larson | |
| 2004/0042019 A1 | 3/2004 | Moro | |
| 2004/0174546 A1 | 9/2004 | Guleryuz | |
| 2004/0190019 A1 | 9/2004 | Li et al. | |
| 2007/0146794 A1 | 6/2007 | Ahmed et al. | |
| 2007/0165284 A1 | 7/2007 | Li et al. | |
| 2007/0177794 A1* | 8/2007 | Gu | 382/160 |
| 2008/0123153 A1 | 5/2008 | Yamada et al. | |
| 2010/0014774 A1* | 1/2010 | Chen et al. | 382/266 |

OTHER PUBLICATIONS

R. C. Gonzalez and R. E. Woods, Digital Image Processing—Chapter 3, Prentice-Hall, 2002, pp. 75-146.

* cited by examiner

*Primary Examiner* — Mike Rahmjoo

(57) ABSTRACT

A method and system of digital image enhancement provide controllable emboldening and thinning of image features. The method includes providing an input image, creating an edge map image from the input image, and combining the edge map image with the input image using local clamping to produce an output image. Features of the output image are one of emboldened and thinned.

15 Claims, 2 Drawing Sheets

DIGITAL IMAGE ENHANCEMENT METHOD AND SYSTEM THAT EMBOLDEN OR THIN IMAGE FEATURES

BACKGROUND

Digital images, especially those that have been generated by a capture device such as, but not limited to, a scanner, multifunction machine, and a camera, contain features that may benefit from enhancement. For example, natural scene images are often enhanced to improve sharpness or to smooth the image using one or more filtering approaches. Similarly, when capturing text using a scanner or similar device, scanned text may result that is either too narrow or too wide as a result of various optical distortions and sampling related causes. Emboldening and thinning techniques may be applied in such instances to correct or adjust the scanned text.

Various image processing methodologies are available for the enhancement of digital images that either embolden or thin features in a digital image. Clipping or shifting a gamma mid-point of a tone curve of a digital image may be used as a crude means of emboldening or thinning features. A technique referred to as an 'unsharp mask' is another example of means for emboldening or thinning digital image features. The local area contrast enhancement (LACE) technique is a competitor to the unsharp mask. Techniques from mathematical morphology techniques may provide either emboldening or thinning. For example, dilation may be employed to make a foreground element thicker resulting in emboldening. Yet other techniques that provide thinning, but cannot be employed for emboldening or thickening, include erosion and the so-called 'hit-or-miss transform'.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Figure 1:
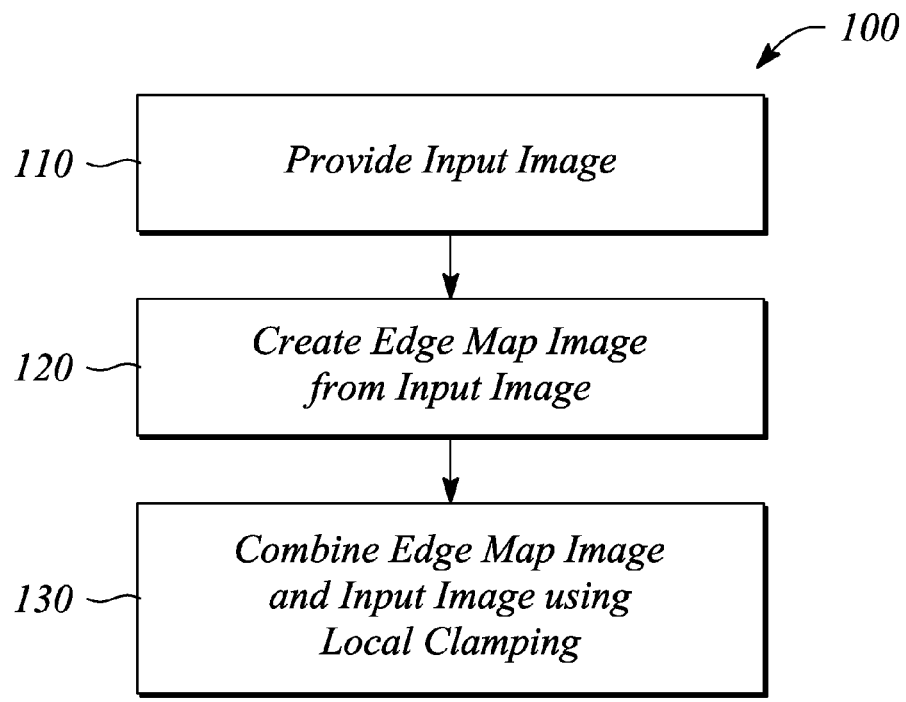
FIG. 1 illustrates a flow chart of a method of digital image enhancement, according to an embodiment of the present invention.

Embodiments of the present invention facilitate image enhancement that provides either emboldening or thinning features in a digital image. In particular, regions or elements within the digital image may be controllably emboldened or thinned according to embodiments of the present invention. For example, text in the digital image may be made to appear thicker (i.e., emboldened) or thinner (i.e., thinned). Embodiments of the present invention provide controllable emboldening and thinning for grayscale and color digital images. Further, emboldening and thinning may be accomplished for mixed-content digital images containing any mixture text, graphics and photographic content. Embodiments of the present invention provide emboldening and thinning without employing filtering (e.g., high pass filter) or similar pre-processing that may otherwise further degrade or distort the digital image during enhancement.

Emboldening and thinning according to embodiments of the present invention may be used to correct or mitigate effects associated with image capture (e.g., scanning). For example, stray light, physical scanning distortions or similar optical artifacts associated with scanning of text may result in the scanned text appearing thinner than a user may desire. Conversely, thicker than desired scanned text may result from under sampling during scanning, for example. Embodiments of the present invention may be employed to correct such capture errors or distortions by controllably emboldening or thinning the text in a scanned image, for example. Alternatively, a user may employ the emboldening and thinning to selectively alter an image when user preference is more desirable than reproduction accuracy. Similarly, embodiments may be employed to mitigate detrimental effects of sharpening or smoothing filtering that may alter boldness of small structures or features in a digital image. In addition, embodiments of the present invention may be used to compensate for dot gain, toner scatter, and other print engine attributes that alter feature boldness, for example.

According to various embodiments, boundaries or edges around foreground regions within the digital image are either controllably shifted or 'pushed' outward to provide emboldening or controllably shifted or 'pulled' inward to accomplish thinning of the foreground region. For example, dark text (i.e., a foreground feature) on a white background may be emboldened by pushing out an edge surrounding a text character such that the dark region of the text character extends further into a portion of the white background. Pushing out the edge of the text effectively makes the text character of the dark text appear thicker. In another example, a dark region of graphics (e.g., a bar of a bar graph) in a digital image may be made thinner by effectively pushing the boundary of the dark region inward toward a center of the dark region. Pushing and pulling occurs under the control of a user selectable or adjustable strength term, according to various embodiments.

Note that, while discussed herein in terms of emboldening or thinning of a dark foreground region on or in the presence of a light background, embodiments of the present invention may also be employed to effectively embolden or thin a light foreground region on a dark background. In particular, emboldening and thinning of light foreground regions within the digital image may be viewed as merely an inverse of the emboldening and thinning of dark foreground regions, according to some embodiments. For example, white text on a dark background may be emboldened to make the text appear thicker by effectively pushing out the boundary separating the light foreground region representing a text character into the dark background region surrounding the character. Pushing out such a boundary of a light foreground region may be accomplished in a manner analogous to pulling in a boundary around a dark region. Thus, emboldening the white text may be effectively equivalent to thinning the dark background region, for example.

In view of the forgoing discussion, the term 'emboldening' as used herein is defined as increasing an extent of a first region (e.g., foreground region) of the digital image at the expense of a second region (e.g., background region) of the digital image. For example, emboldening dark text on a light background increases the extent of the dark text by pushing out edges of the dark text into the light background. The increased extent of the dark region (e.g., the dark text) effectively replaces a portion of the light background region bordering the dark region. Similarly, the term 'thinning' is defined as the opposite of emboldening such that thinning reduces an extent of the first region by adding to an extent of the second region that borders the first region. For example, thinning dark text on a light background effectively decreases an extent of the dark text by replacing a portion of the dark text with a background color at or along a boundary of the dark text. Further, emboldening the first region may be equivalent to thinning the second region, in some embodiments, as is discussed above.

Various embodiments of the present invention employ an edge map or more precisely an edge map image of a digital image provided as an input (i.e., the input image). In particular, an edge map image of the input image is created or constructed from the input image, according to some embodiments. The edge map image represents edges or boundaries separating regions (e.g., a foreground region and a background region) within the input image. In some embodiments, an edge detector is employed to create the edge map image. The edge detector locates and identifies edges within the input image.

In some embodiments, the edge detector creates an edge map image that comprises edges of the input image without additional detail. As such, the edge map image effectively represents just the edges of the digital image. In other embodiments, the detector creates an edge map image comprising edges along with some other details of the input image. For example, the edge map image may effectively represent the input image with the edges that are merely emphasized while retaining other non-edge related elements or features of the input image.

In some embodiments, the edge map image may be an isotropic edge map of the digital image. The isotropic edge map effectively represents edges without consideration of or reference to a specific orientation of the edges. All edges may be included in an isotropic edge map image. Emboldening (or thinning) that employs an isotropic edge map image, according to embodiments of the present invention, effectively increases (or decreases) an extent of the first region around an entire periphery of the first region. For example, emboldening a text character using an isotropic edge map image may uniformly increase the size of the text character.

In other embodiments, the edge map image may be anisotropic. For example, the edge map image may include or emphasize only horizontal edges. Using such an exemplary horizontally biased anistropic edge map image to embolden (or thin) a first region may result in the first region becoming wider (or narrower) in only a horizontal extent, according to some embodiments. For example, applying a horizontally biased anistropic edge map to a text character may increase a width of the text character but not a height. In another example, the edge map image may include only vertical edges. Such an exemplary vertically biased anistropic edge map may be used to increase a vertical extent of the first region with little or no effect on the horizontal extent. Other orientations or biases of anistropic edge map images in addition to horizontal and vertical are also within the scope of the present invention.

Embodiments of the present invention employ edge detection or an edge detector to create the edge map image. As used herein, the term 'edge detection' is defined as any means for locating and identifying features of the digital image that represent edges or that characterize object boundaries within the digital image. Edges or edge points in a digital image are typically locations of abrupt changes in a magnitude (e.g., abrupt gray-level or luminance change) of pixels as a function of distance across the image. For example, an edge of a black text character on a white background may be exemplified by an abrupt change in pixel magnitude from 0 (i.e., black) to 255 (i.e., white) over a distance of about 1-2 pixels within the digital image.

Any of a wide variety of edge detectors or edge detection operators may be employed to create the edge map image from the input image, according to embodiments of the present invention. For example, a high pass filter may be employed to detect edges in the input image and to construct the edge map image. The high pass filter detects edges because edges are typically exemplified by high frequency image components of the digital image. Another example of an edge detection operator, based on a second derivative, is the Laplace operator. In yet other example, edges may be detected and the edge map image constructed using either a gradient operator or a compass operator.

For digital images, edge detection operators based on a gradient are generally represented by finite-difference approximations of the true gradient. Similarly, the Laplace operator is a finite-difference approximation of a true second derivative as a function of direction. In practice, these approximations that act as edge detection operators are realized as a mask or a matrix (e.g., a matrix having 2×2, 3×3 or 5×5 elements) often referred to as a 'kernel'. Similarly, any digital image may also be regarded as a matrix, albeit much larger than the edge detection kernel that serves as an edge detection operator for the digital image.

In some embodiments, a plurality of edge detection kernels is employed, especially when creating an isotropic edge map of the digital image. For example, a pair of kernels may be employed where a first kernel detects a first orientation or type of edge (e.g., horizontal edges) and a second kernel detects a second type of edge (e.g., vertical edges). The pair of kernels, when employed together, may be used to create an isotropic or nearly isotropic edge map image. Such an isotropic edge map image includes both edge types (e.g., horizontal and vertical edges) which may be effectively all of the edges present in the digital image. On the other hand, for an anisotropic edge map, a single kernel (e.g., just the horizontal kernel or just the vertical kernel) may be sufficient.

In some embodiments, the edge map image is created by convolving the input image with the kernel or kernels representing a particular edge detection operator. Examples of edge detection kernels based on a gradient that may be convolved with the input image to produce the edge map image include, but are not limited to, Roberts kernels, Sobel kernels, Smoothed or Prewitt kernels, Canny kernels, and Isotropic kernels. For digital images, convolving generally comprises a digital convolution of the input image and the edge detection kernel(s) represented by an n×n matrix, where n is an integer (e.g., n=3).

For example, a pair of Sobel kernels may be employed as the edge detection kernels to construct the edge map image according to embodiments of the present invention. A first Sobel kernel V provides detection of horizontal edges while a second Sobel kernel H is used to detect vertical edges. The first and second Sobel kernels H, V may be defined in terms of 3×3 matrices given by equations (1) and (2).

$$V = \begin{bmatrix} -1 & -2 & -1 \\ 0 & 0 & 0 \\ 1 & 2 & 1 \end{bmatrix} \quad (1)$$

$$H = \begin{bmatrix} -1 & 0 & 1 \\ -2 & 0 & 2 \\ -1 & 0 & 1 \end{bmatrix} \quad (2)$$

In some embodiments, the Sobel kernels may be scaled prior to convolving with the input image. Scaling the Sobel kernels may effectively reduce a chance of overflow during the convolution, in some embodiments. For example, if pixels of the digital image have a bit-depth of b bits (e.g., b=8), the Sobel kernels V, H may be scaled as given by equations (3) and (4) to yield scaled Sobel kernels V', H'.

$$V' = \frac{2V}{b} \qquad (3)$$

$$H' = \frac{2H}{b} \qquad (4)$$

The scaled Sobel kernels V', H' are then convolved with the input image to produce the edge map image, for example. Similar scaling may be employed with other edge detection kernels to produce other scaled edge detection kernels.

In some embodiments, as was mentioned above, the input image is convolved with the edge detection kernels to produce the edge map image. In some embodiments, scaled edge detection kernels are employed. For example, the scaled Sobel kernels V', H' may be convolved with an input image G to produce a pair of convolution images G1 and G2 as given in equations (5) and (6), $$G1 = H'*G \qquad (5)$$

$$G2 = V'*G \qquad (6)$$

where the operator '*' represents digital convolution. The exemplary convolution images G1 and G2 in equations (5) and (6) represent edge maps corresponding respectively to vertical edges and horizontal edges present in the input image G.

According to some embodiments, an edge map image G3 may be created by combining the convolution images G1 and G2. For example, the edge map image G3 may be computed by adding images according to equation (7), $$G3 = abs(G1) + abs(G2) \qquad (7)$$

where the function abs(·) represents an appropriate absolute value. An appropriate absolute value when the convolution images G1 and G2 are gray-scale images may be simply the magnitude of the pixel values of the respective convolution images G1 and G2, for example. For color images, the function 'abs(·)' may be a magnitude of a luminance channel of the respective convolution images, for example.

Embodiments of the present invention produce the output image by combining the input image and the edge map image. In some embodiments, combining comprises adding the input image to the edge map image using matrix addition (i.e., adding the images together pixel-by-pixel). In some embodiments, combining may employ a strength term or factor. In particular, the strength term may be employed to effectively scale a 'strength' of the edge map image relative to the input image as the edge map image is combined with the input image. For example, the input image G may be combined with the edge map image G3 as given by equation (8), $$G4 = G + \alpha \cdot G3 \qquad (8)$$

where $\alpha$ is the strength term and the operator '+' indicates matrix addition. In some embodiments, the strength term may be effectively normalized to a range between minus one and one (e.g., $\alpha = [-1, 1]$).

Embodiments of the present invention employ local clamping of pixel values of the output image. Local clamping is employed when pixels of the output image are created. The use of local clamping may reduce a chance for pixel value overshoot, for example. In particular, overshoot may be mitigated with local clamping by effectively restricting a dynamic range of pixel values produced when the input image and edge map image are combined in the production of the output image.

The term 'local clamping' as used herein is defined as clamping, limiting or otherwise restricting a value of a central pixel in a manner that is based on or determined by a value or values of pixels in a local vicinity of a central pixel. By definition herein, the 'central pixel' is a particular or selected pixel that is being subjected to the local clamping. For example, local clamping may limit a value of the central pixel at a location given by indices i,j to be within a range of pixel values represented in pixels that surround the central pixel location. The range may be bounded by a maximum value and a minimum value of pixels that border the central pixel, for example. In another example, local clamping may limit the central pixel value to be within a range of values around an average value of pixels in a local vicinity of the central pixel.

In some embodiments, the local vicinity used in local clamping may be defined by a window function centered on the central pixel. Values of the pixels in the window are used to determine the clamping (e.g., to set a maximum and a minimum or i.e., a range bounded by the maximum and minimum). The window may include only pixels in locations that are immediately adjacent to the central pixel, for example. In another example, the window may include pixels beyond those that are immediately adjacent to the central pixel location. The window may have effectively any shape. For example, the window may be a square window (e.g., a 3×3 window or a 5×5 window).

In some embodiments, the local clamping establishes a hard limit to a value of the central pixel. For example, clamping the central pixel may limit or restrict the central pixel value to be less than a maximum value but greater than a minimum value. The maximum value may be a maximum value of pixels surrounding the central pixel location while the minimum value may be determined from a minimum value of surrounding pixels, for example. In another example, the hard limit may be based on an average value of surrounding pixel values along with an arbitrary or predetermined range of values above and below that average (e.g., the average value $P_{avg} \pm 4$). In other embodiments, the local clamping may establish a soft limit for a value of the central pixel. For example, the local clamping may be based on a distribution function (e.g., a Gaussian distribution) that merely establishes a probability that the central pixel value is within a specified range that is determined from pixel values in the local vicinity or neighborhood of the central pixel.

For example, the local clamping may be implement according to equation (9), $$G5_{i,j} = \begin{cases} M_{i,j}, & G4_{i,j} > M_{i,j} \\ N_{i,j}, & G4_{i,j} < N_{i,j} \\ G4_{i,j}, & \text{otherwise} \end{cases} \qquad (9)$$

where $G5_{i,j}$ is a value of the central pixel of the output image G5 that is being created, $G4_{i,j}$ is a pixel value in the combined image G4 of equation (8) at a location that corresponds to the output image central pixel, $M_{i,j}$ is a local maximum pixel value, and $N_{i,j}$ is a local minimum pixel value for the location i,j. As defined by equation (9), a value $G5_{i,j}$ of the output image central pixel at location i, j is set equal to the local maximum pixel value $M_{i,j}$ if the combined image pixel value $G4_{i,j}$ is greater than the local maximum pixel value $M_{i,j}$.

Alternatively, the output image central pixel value $G5_{i,j}$ is set equal to the local minimum pixel value $N_{i,j}$ if the combined image pixel value $G4_{i,j}$ is less than the local minimum pixel value $N_{i,j}$. Otherwise, the output image central pixel value $G5_{i,j}$ is set equal the corresponding pixel value $G4_{i,j}$ of the combined image. The local maximum pixel value $M_{i,j}$ may be a largest pixel value in the input image G in an n×n neighborhood (e.g., 3×3 neighborhood) around a corresponding pixel of the input image G (e.g., around an pixel of G located at i,j), for example. Similarly, the local minimum pixel value N may be a smallest pixel value in the input image G in the n×n neighborhood around a corresponding pixel of the input image G, for example. As such, the local neighborhood may be defined by a sliding window centered on the i,j location in the input image G when determining the local maximum pixel value $M_{i,j}$ and the local minimum value $N_{i,j}$.

Herein, a 'grayscale' image is defined as a digital image that is represented by an array (i.e., matrix) of pixels, each pixel being represented by a number that indicates a gray level or intensity (e.g., darkness or lightness) of the pixel. The number may be represented by a binary number having b bits. The number of bits b in the binary number representing the pixel of a grayscale image is referred to as a 'bit-depth'. For example, a grayscale image may have pixels represented by an 8-bit binary number (e.g., bit-depth b=8). For such a grayscale image, the gray level or pixel value of each pixel may range from 0 to 255. Herein, the bit-depth of a grayscale image is defined to be strictly greater than one (i.e., b>1).

Some digital images (e.g., color images) may employ more than one number or channel to represent a pixel. However, all such digital images may be effectively converted to a grayscale image or be represented by a luminance channel for the purposes of the present invention. For example, a relative or average intensity of three hues of a given pixel (e.g., 3 numbers representing three primary colors that define a pixel color) may be mapped into a single number representing a gray level of the pixel to convert the color digital image into a grayscale image.

For discussion purposes herein and without loss of generality, digital images such as, but not limited to, the input image G and edge map image G3 as well as the various edge detection kernels (e.g., the Sobel kernels V and H) that may be applied thereto are treated as rectangular matrices. Operations used to combine or modify these matrices have the usual meaning in matrix algebra, unless otherwise specified. For example, the '+' operator in equations (7) and (8) is conventional matrix addition. Further herein, reference to a 'corresponding' pixel in an output image (e.g., enhanced image) is defined as a particular pixel in the output image that is one or more of created from or otherwise related to a pixel(s) in an input image by virtue of its location with respect to an image processing operation performed on the input image. For example, a pixel at a location i,j of the input image may be mapped into a location i,j of the output image by various embodiments the present invention. In this example, the pixel at the location i,j of the output image is the 'corresponding pixel' to the pixel at the location i,j in the input image.

For simplicity herein, no distinction is made between a digital image and a grayscale image or a color image unless such a distinction is necessary for proper understanding. Further, as used herein, the article 'a' or 'an' is intended to have its ordinary meaning in the patent arts, namely 'one or more'. For example, 'an image' generally means 'one or more images' and as such, 'the image' means 'the image(s)' herein. Also, any reference herein to 'top', 'bottom', 'upper', 'lower', 'up', 'down', 'left' or 'right' is not intended to be a limitation herein. Furthermore, terms such as 'about' and 'approximately' generally refer to a tolerance of +/−10% about a value to which the term is applied unless otherwise specified herein. Moreover, examples herein are intended to be illustrative only and are presented for discussion purposes and not by way of limitation.

FIG. 1 illustrates a flow chart of a method 100 of digital image enhancement, according to an embodiment of the present invention. The method 100 of digital image enhancement effectively provides an output image in which features in the output image are controllably either emboldened or thinned. The features are objects or regions within the digital image bounded by edges therein. The output image provided by the method 100 of digital image enhancement may be one or more of stored in a memory, displayed to a user, passed to another image processing operation and transmitted over a communication channel.

As illustrated in FIG. 1, the method 100 of digital image enhancement comprises providing 110 an input image. The input image may be provided 110 by any of a variety of means. For example, providing 110 an input image may comprise scanning an image using an optical scanner. The optical scanner may be part of a multifunction printer/scanner/copier, for example. In another example, providing 110 an input image may comprise capturing the image with a digital camera. In yet another example, providing 110 an input image may comprise retrieving an image file from memory of a computer or receiving the image file from a remote location via a communication channel (e.g., the Internet).

In some embodiments, the provided 110 input image is a gray-scale digital image. In other embodiments, the provided 110 input image is a color image. In some embodiments the input image comprises text represented as text characters. For example, the input image may be provided 110 by scanning a document to produce a gray-scale digital image of text in the document. In other embodiments, the input image comprises one or more of graphic content and photographic content. For example, the input image may be provided 110 by a digital camera that captures a natural scene (i.e., photographic content). In yet other embodiments, the input image comprises mixed content that may include text, graphic content and photographic content. For example, providing 110 an input image may comprise scanning a document that includes a color picture along with text. The text may be one or both outside of and within a boundary of the color picture, for example.

The method 100 of digital image enhancement further comprises creating 120 an edge map image from the input image. Creating 120 an edge map image identifies and locates edges in the input image. Creating 120 an edge map image reproduces the identified and located edges as the edge map image.

In some embodiments, creating 120 an edge map image comprises convolving the input image with an edge detection kernel. In some embodiments, the edge detection kernel comprises a plurality of kernels, each kernel of the plurality effectively detecting differently oriented edges. For example, the edge detection kernel may comprise the Sobel kernels V, H described above with reference to equations (1) and (2). In another example, the edge detection kernel may be a pair of scaled edge detection kernels such as, but not limited to, the scaled Sobel kernels V', H' described above with reference to equations (3) and (4). In particular, in some embodiments, the edge detection kernel comprises a scaled vertical Sobel kernel and a scaled horizontal Sobel kernel. In some of these embodiments, the edge map image comprises a sum of an absolute value of a result of convolving using the scaled vertical Sobel kernel and an absolute value of a result of convolving using the scaled horizontal Sobel kernel.

The method 100 of digital image enhancement further comprises combining 130 the edge map image with the input image using local clamping. Combining 130 using local clamping produces an output image having features that are one of emboldened or thinned. In some embodiments, combining 130 using local clamping comprises determining for a selected central pixel of the output image a maximum value M and a minimum value N of pixels in a local neighborhood around a corresponding pixel of the input image. For example, the local neighborhood may comprise a 3×3 neighborhood defined by a window function centered on the central pixel. In another example, a 5×5 neighborhood is employed.

Combining 130 using local clamping further comprises assigning a value of the central pixel of the output image to be equal to a value of a corresponding pixel in a sum of the edge map image and the input image unless the corresponding pixel value of the sum either exceeds the maximum value M or is less than the minimum value N. When the corresponding pixel value of the sum exceeds the maximum value M, the value of the selected central pixel is set equal to the maximum value M. Alternatively, when the corresponding pixel value of the sum is less than the minimum value N, the value of the selected central pixel is set equal to the minimum value N. For example, combining 130 the edge map image with the input image using local clamping may be implemented according to equation (9).

In some embodiments (not illustrated), the method 100 of digital image enhancement further comprises applying a strength term to the edge map image. The strength term scales the edge map image to control whether the image enhancement emboldens or thins the features and also controls an amount of the respective emboldening or thinning. In some embodiments, applying the strength term comprises multiplying the edge image by the strength term before the edge map image is combined with the input image. For example, applying a strength term may be implemented according to equation (8). The strength term may be a scalar value between minus one and one, for example.

Figure 2:
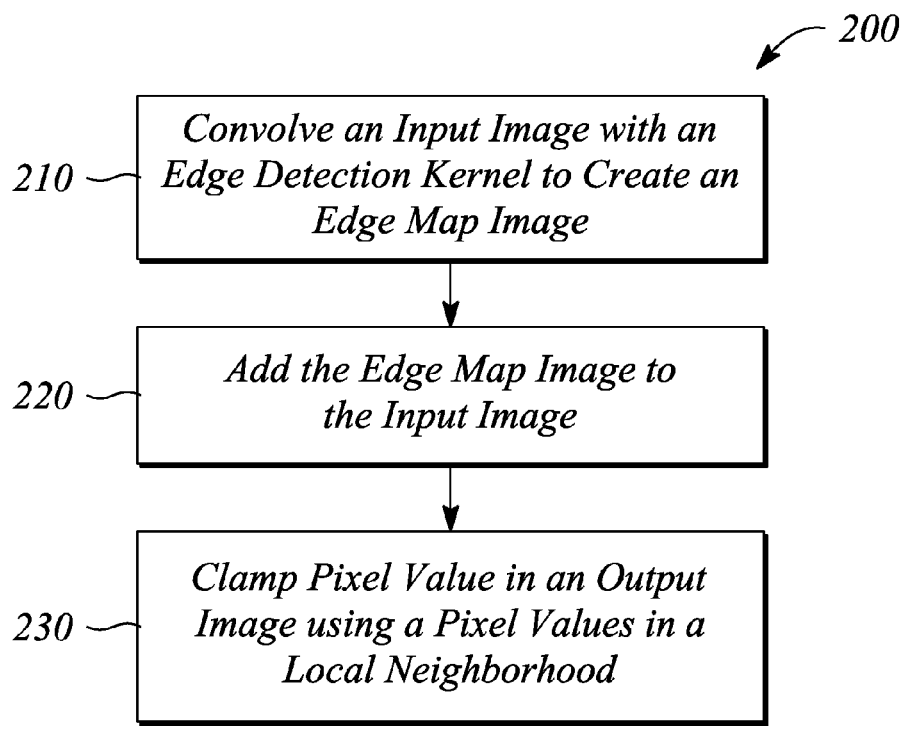
FIG. 2 illustrates a flow chart of a method of digital image enhancement, according to another embodiment of the present invention.

FIG. 2 illustrates a flow chart of a method 200 of digital image enhancement, according to another embodiment of the present invention. The method 200 produces an output image that is enhanced by having features either controllably emboldened or controllably thinned. The controllably emboldened or thinned output image may be one or more of stored in a memory, displayed to a user, passed to another image processing operation and transmitted over a communication channel, according to various embodiments.

As illustrated in FIG. 2, the method 200 comprises convolving 210 an input image G with an edge detection kernel to produce an edge map image G3. The input image G and the edge detection kernel may be represented by rectangular matrices and convolving may comprise digital convolution, according to some embodiments. For example, the edge detection kernel may comprise a vertical Sobel kernel V and a horizontal Sobel kernel H given by equations (1) and (2), respectively. Other edge detection kernels may be employed such as, but not limited to, those discussed above. In some embodiments, the edge map image G3 is given by equation (10) as $$G3 = \text{abs}\left(\frac{V}{b'} * G\right) + \text{abs}\left(\frac{H}{c'} * G\right), \tag{10}$$

where the operator '*' denotes a digital convolution, the function abs(·) represents an appropriate absolute value, and variables b' and c' are scale factors. In some embodiments, the scale factors b', c' are selected such that the convolution does not exceed a bit depth available for the edge map image G3. In some embodiments, the scale factors b' and c' may be equal (i.e., b'=c'). For example, both the scale factor b' and the scale factor c' may be equal to the bit depth b divided by 2 (e.g., b'=b/2 and c'=b/2). In other embodiments, the scale factors b', c', are selected to have values that differ from one another. For example, the scale factor b' and the scale factor c' may be selected to have different values such that the respective convolutions in equation (10) respond differently to vertical edges and horizontal edges.

The method 200 of digital image enhancement as illustrated in FIG. 2 further comprises adding 220 the edge map image G3 to the input image G. Adding 220 the image G3 and G may be conventional matrix addition that adds pixels in the edge map image G3 and the input image G on a point-by-point or pixel-by-pixel basis, for example. Adding 220 the images produces a summed image G4. In some embodiments, the edge map image G3 is scaled prior to being added 220 to the input image G. In some of these embodiments, the edge map image G3 is scaled by multiplying the edge map image G3 by a scalar-valued strength term a. For example, equation (8) may be employed to scale the edge map image G3. A sign of the strength term a determines whether the digital image enhancement of method 200 results is either emboldening or thinning. A magnitude of the strength term a controls an amount of the digital image enhancement provided according to the method 200.

As illustrated in FIG. 2, the method 200 of digital image enhancement further comprises clamping 230 a value of a pixel $G5_{i,j}$ in an output image G5 to be between a local maximum value $M_{i,j}$ and a local minimum value $N_{i,j}$ of pixels in a local neighborhood of a corresponding pixel $G_{i,j}$ in the input image. In some embodiments, clamping 230 a pixel value may be implemented according to equation (9). In some embodiments, a rectangular window function is employed to define the local neighborhood for clamping 230. For example, the local neighborhood may be defined as a three-by-three (3×3) array of pixels centered on the corresponding pixel $G_{i,j}$ in the input image G using a 3×3 square window function.

Figure 3:
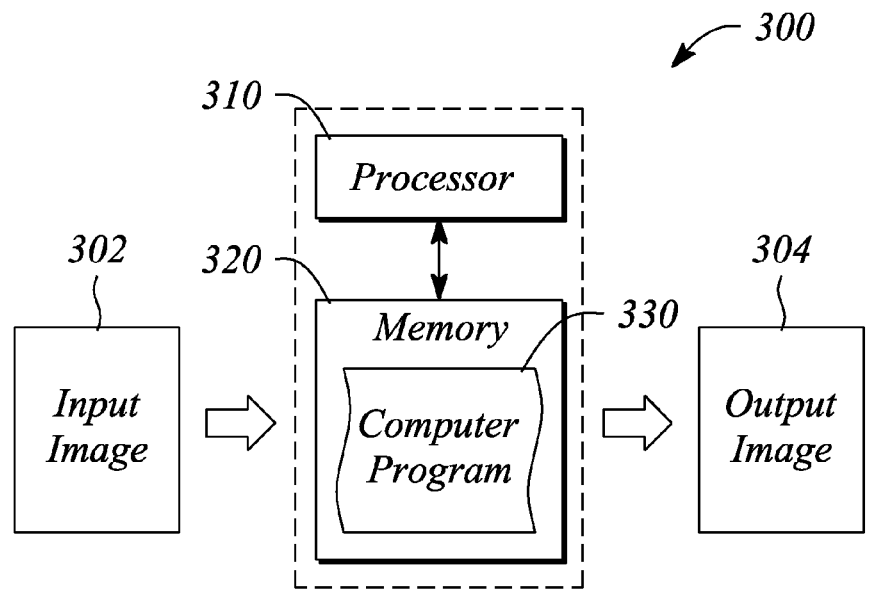
FIG. 3 illustrates a block diagram of a digital image enhancement system, according to an embodiment of the present invention.

FIG. 3 illustrates a block diagram of a digital image enhancement system 300, according to an embodiment of the present invention. The digital image enhancement system 300 accepts an input image 302 and produces an output image 304. Features represented in the input image 302 as represented in the output image 304 are one of emboldened or thinned by the digital image enhancement system 300.

The digital image enhancement system 300 comprises a processor 310 and memory 320. For example, the processor 310 may be a central processing unit (CPU) of a general purpose computer. In another example, the processor 310 may be an embedded processor, microprocessor, or CPU in a device including, but not limited to, a scanner, a printer, a multifunction scanner/printer/copier, a facsimile (FAX) machine, and a camera. In yet another example, the processor 310 may be a specialized processor such as, but not limited to, an image processor.

The memory 320 may be any memory that is accessed by the processor 310. For example, the memory 320 may be random access memory (RAM), read only memory (ROM), a magnetic or optical drive (e.g., computer hard disk) or another disk drive of a general purpose computer that either includes or is connected to the processor 310. In another example, memory 320 comprises removable media including, but not limited to, floppy disk, a compact disk (CD), a digital versatile disk (DVD), and a memory card (e.g., a USB flash drive). In some embodiments, one or both of the processor 310 and the memory 320 are implemented as an application specific integrated circuit (ASIC).

The digital image enhancement system 300 further comprises a computer program 330. The computer program 330 is stored in the memory 320. For example, the computer program 330 may be implemented as a set of C/C++ language instructions. In another embodiment, the computer program 330 may be realized as firmware. Instructions of the computer program 330, when executed by the processor 310, implement creating an edge map image of an image inputted to the system, and combining the edge map image with the input image 302 using local clamping to produce an output image 304. Using local clamping, as implemented by the instructions of the computer program 330, constrains a value of each pixel in the output image 304 to be less than a local maximum value M and greater than a local minimum value N of a local neighborhood surrounding a corresponding pixel in the input image 302, according to some embodiments.

In some embodiments, instructions of the computer program 330 that implement creating the edge map image comprise instructions that implement performing a convolution of the input image 302 with one or more edge detection kernels. For example, a pair of Sobel kernels may be employed where a first Sobel kernel of the pair represents a vertical Sobel kernel and a second Sobel kernel represents a horizontal Sobel kernel.

In some embodiments, instructions of the computer program 330 that implement creating the edge map image further comprise instructions that implement computing an absolute value of a first convolution result produced by performing the convolution of the input image 302 and a first edge detection kernel (e.g., the first Sobel kernel). In some embodiments, instructions of the computer program 330 that implement creating the edge map image further comprise instructions that implement computing an absolute value of a second convolution result produced by performing the convolution of the input image 302 and the second edge detection kernel (e.g., the second Sobel kernel). In some embodiments, instructions of the computer program 330 that implement creating the edge map image further comprise instructions that implement summing the absolute value of the first convolution result and the absolute value of the second convolution result to produce the edge map image. In some embodiments, the instructions of the computer program 330 essentially implement the method 100 of digital image enhancement described above. In some embodiments, the instructions of the computer program 330 essentially implement the method 200 of digital image enhancement described above.

In some embodiments, the digital image enhancement system 300 is implemented as part of an image capture device. For example, the digital image enhancement system 300 may be built into a scanner or a multifunction machine that provides scanning, faxing and printer. The processor 310 and memory 320 of the digital image enhancement system 300 may be the processor and memory of the scanner or multifunction machine, for example. In other embodiments, the digital image enhancement system 300 may further comprise means for providing the input image 302. For example, the means for providing the input image 302 may include, but is not limited to, a scanner, multifunction machine, and camera. The provided input image 302 is employed (e.g., operated on) by the computer program 330, in some embodiments.

Figure 4:
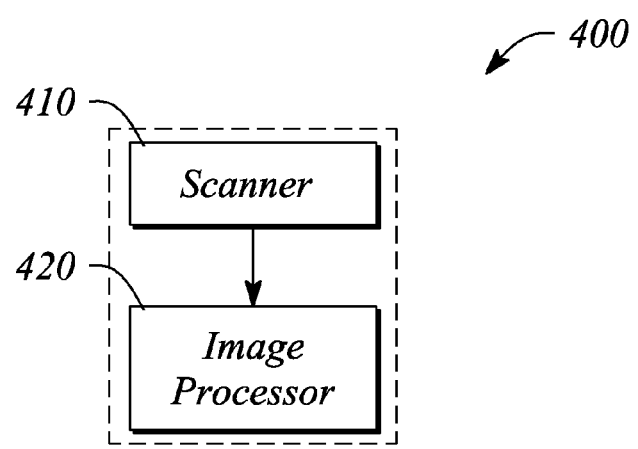
FIG. 4 illustrates a block diagram of a scanning system that provides digital image enhancement, according to an embodiment of the present invention.

FIG. 4 illustrates a block diagram of a scanning system 400 that provides digital image enhancement, according to an embodiment of the present invention. The scanning system 400 comprises a scanner 410. The scanner 410 scans an image source to produce a digital image. The image source may be a page from a document, for example. In some embodiments, the scanner 410 is a component of a multifunction printer or a FAX machine. In some embodiments, the scanning system 400 is an example of the digital image enhancement system 300 described above.

The scanning system 400 further comprises an image processor 420. The image processor 420 processes the digital image produced by the scanner 410. In some embodiments, the image processor 420 comprises a computer program having instructions that, when executed, implement creating an edge map image of an image input to the system, and combining the edge map image with the input image using local clamping to produce an output image. Using local clamping as implemented by the instructions constrains a value of each pixel in the output image to be less than a local maximum value M and greater than a local minimum value N of a local neighborhood surrounding a corresponding pixel in the input image, according to some embodiments. In some embodiments, the instructions of the computer program in the image processor 420 of the scanner 400 essentially implement the method 100 of digital image enhancement described above.

In other embodiments, the computer program of the image processor 420 comprises instructions that, when executed, implement convolving an input image G with one or more edge detection kernels to produce an edge map image G3, adding the edge map image G3 to the input image G to produce a summed image G4, and clamping a value of a pixel $G5_{i,j}$ in an output image G5 to be between a local maximum value $M_{i,j}$ and a local minimum value $N_{i,j}$ of pixels in a local neighborhood of a corresponding pixel $G_{i,j}$ in the input image G. In some embodiments, the instructions of the computer program in the image processor 420 essentially implement the method 200 of digital image enhancement described above.

Thus, there have been described embodiments of a method of digital image enhancement and systems employing digital image enhancement system that provide emboldening and thinning of features in an input image. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A method of digital image enhancement, the method comprising:
  creating an edge map image from an input image using a processor; and
  combining the edge map image with the input image using local clamping to produce an output image having features that are one of emboldened and thinned,
  wherein local clamping limits a value of a central pixel based on a value of a pixel in a local vicinity of the central pixel and wherein the output image is one or more of stored in a memory, displayed to a user, passed to another image processing operation and transmitted over a communication channel.

2. The method of digital image enhancement of claim 1, wherein creating an edge map image comprises convolving the input image with an edge detection kernel.

3. The method of digital image enhancement of claim 2, wherein the edge detection kernel comprises a scaled vertical Sobel kernel and a scaled horizontal Sobel kernel, the edge map image comprising a sum of an absolute value of a result of convolving using the scaled vertical Sobel kernel and an absolute value of a result of convolving using the scaled horizontal Sobel kernel.

4. The method of digital image enhancement of claim 1, further comprising applying a strength term to the edge map image, the strength term scaling the edge map image to control whether the image enhancement emboldens or thins the features and also controls an amount of the respective emboldening or thinning, wherein applying a strength term comprises multiplying the edge image by the strength term before the edge map image is combined with the input image.

5. The method of digital image enhancement of claim 1, wherein combining the edge map image with the input image using local clamping comprises:
  determining for a selected central pixel of the output image a maximum value M and a minimum value N of pixels in a local neighborhood around a corresponding pixel of the input image; and
  assigning a value of the selected central pixel of the output image to be equal to a value of a corresponding pixel in a sum of the edge map image and the input image unless the corresponding pixel value of the sum either exceeds the maximum value M or is less than the minimum value N,
  wherein when the corresponding pixel value of the sum exceeds the maximum value M, the value of the selected central pixel is set equal to the maximum value M, and wherein when the corresponding pixel value of the sum is less than the minimum value N, the value of the selected central pixel is set equal to the minimum value N.

6. The method of digital image enhancement of claim 1, further comprising providing an input image, wherein providing the input image comprises scanning an image using an optical scanner.

7. The method of digital image enhancement of claim 1, wherein the input image is a grayscale image.

8. The method of digital image enhancement of claim 1, wherein the input image is a color image, a luminance channel of the color image being employed in creating the edge map image.

9. A method of digital image enhancement, the method comprising:
  convolving an input image G with an edge detection kernel to produce an edge map image G3 using a processor;
  adding the edge map image G3 to the input image G to produce a summed image G4 using the processor; and
  clamping a value of a pixel $G5_{i,j}$ in an output image G5 to be between a local maximum value $M_{i,j}$ and a local minimum value $N_{i,j}$ of pixels in a local neighborhood of a corresponding pixel $G_{i,j}$ in the input image G, wherein clamping a value is implemented according to:

$$G5_{i,j} = \begin{cases} M_{i,j} & \text{if } G4_{i,j} > M_{i,j} \\ N_{i,j} & \text{if } G4_{i,j} < N_{i,j} \\ G4_{i,j} \end{cases},$$

where $G4_{i,j}$ is a pixel value of the summed image G4 that corresponds to the pixel $G5_{i,j}$, the output image G5 having features that are one of emboldened and thinned,
  wherein the output image G5 is one or more of stored in a memory, displayed to a user, passed to another image processing operation and transmitted over a communication channel.

10. The method of digital image enhancement of claim 9, wherein the edge map image G3 is scaled prior to being added to the input image G, wherein scaling the edge map image G3 comprises multiplying the edge map image G3 by a scalar-valued strength term α, and
  wherein a sign of the strength term a determines whether the digital image enhancement results in either emboldening or thinning, a magnitude of the strength term α controlling an amount of the digital image enhancement.

11. The method of digital image enhancement of claim 9, wherein the local neighborhood comprises a three-by-three array of pixels centered on the corresponding pixel $G_{i,j}$ in the input image G.

12. The method of digital image enhancement of claim 9, wherein the edge detection kernel comprises a vertical Sobel kernel V and a horizontal Sobel kernel H given respectively by:

$$V = \begin{bmatrix} -1 & -2 & -1 \\ 0 & 0 & 0 \\ 1 & 2 & 1 \end{bmatrix},$$

$$H = \begin{bmatrix} -1 & 0 & 1 \\ -2 & 0 & 2 \\ -1 & 0 & 1 \end{bmatrix},$$

and wherein the edge map image G3 is given by:

$$G3 = \text{abs}\left(\frac{V}{b'} * G\right) + \text{abs}\left(\frac{H}{c'} * G\right),$$

where the operator '*' denotes a digital convolution, the function abs(·) represents an appropriate absolute value, and variables b' and c' are scale factors selected such that the convolution does not exceed a bit depth available for the edge map image G3.

13. A digital image enhancement system comprising:
  a processor;
  a memory; and
  a computer program stored in the memory, the computer program having instructions that, when executed by the processor, implement creating an edge map image of an image input to the system, and combining the edge map image with the input image using local clamping to produce an output image,
  wherein using local clamping constrains a value of each pixel in the output image to be less than a local maximum value M and greater than a local minimum value N of a local neighborhood surrounding a corresponding pixel in the input image.

14. The digital image enhancement system of claim 13, wherein the instructions that implement creating the edge map image comprise instructions that implement:
  performing a convolution of the input image with a pair of Sobel kernels, a first Sobel kernel of the pair representing a vertical Sobel kernel and a second Sobel kernel of the pair representing a horizontal Sobel kernel; and
  computing an absolute value of a first convolution result produced by performing the convolution of the input image with the first Sobel kernel;
  computing an absolute value of a second convolution result produced by performing the convolution of the input image with the second Sobel kernel; and summing the first convolution result absolute value and the second convolution result absolute value to produce the edge map image.

15. The digital image enhancement system of claim 13, further comprising one of a scanner and a multifunction machine that provides the input image that is employed by the computer program.

\* \* \* \* \*

UNITED STATES PATENT AND TRADEMARK OFFICE
CERTIFICATE OF CORRECTION

PATENT NO.         : 8,554,005 B1                                   Page 1 of 1
APPLICATION NO.    : 12/417615
DATED              : October 8, 2013
INVENTOR(S)        : Peter Majewicz It is certified that error appears in the above-identified patent and that said Letters Patent is hereby corrected as shown below:

In the Claims

In column 14, line 6, in Claim 10, delete "term a" and insert -- term $\alpha$ --, therefor.

In column 14, line 47, in Claim 13, delete "image input" and insert -- input image --, therefor.

Signed and Sealed this
Third Day of December, 2013

Margaret A. Focarino
*Commissioner for Patents of the United States Patent and Trademark Office*